United States Patent
Naiden et al.

(10) Patent No.: US 10,567,225 B2
(45) Date of Patent: Feb. 18, 2020

(54) REGION-SPECIFIC CONFIGURATION

(71) Applicant: APPLE INC., Cupertino, CA (US)

(72) Inventors: Aleksei Naiden, Cupertino, CA (US); Daniel B. Pollack, Cupertino, CA (US); Gokul P. Thirumalai, Cupertino, CA (US); Robert Y. Loh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 15/270,809

(22) Filed: Sep. 20, 2016

(65) Prior Publication Data
US 2017/0359216 A1    Dec. 14, 2017

Related U.S. Application Data

(60) Provisional application No. 62/348,827, filed on Jun. 10, 2016.

(51) Int. Cl.
*H04L 12/24* (2006.01)
*H04L 29/08* (2006.01)
*H04W 4/029* (2018.01)

(52) U.S. Cl.
CPC ........ *H04L 41/082* (2013.01); *H04L 41/0816* (2013.01); *H04L 67/18* (2013.01); *H04L 67/2842* (2013.01); *H04L 67/34* (2013.01); *H04W 4/029* (2018.02)

(58) Field of Classification Search
CPC ... H04L 41/082; H04L 41/0816; H04L 67/18; H04L 67/2842; H04L 67/34; H04W 4/50; H04W 4/02
See application file for complete search history.

(56) References Cited

U.S. PATENT DOCUMENTS

| | | | |
|---|---|---|---|
| 9,578,090 B1* | 2/2017 | MacVittie | H04L 67/327 |
| 2005/0286514 A1* | 12/2005 | Cheshire | H04L 67/34 370/389 |
| 2007/0268516 A1* | 11/2007 | Bugwadia | H04L 67/34 358/1.15 |
| 2010/0069062 A1* | 3/2010 | Horn | H04W 60/00 455/434 |
| 2012/0089713 A1* | 4/2012 | Carriere | H04L 12/4641 709/222 |
| 2013/0054812 A1* | 2/2013 | DeCoteau | H04W 4/50 709/226 |

(Continued)

*Primary Examiner* — Michael A Keller
*Assistant Examiner* — Jsing Forng Lin
(74) *Attorney, Agent, or Firm* — Fletcher Yoder P.C.

(57) ABSTRACT

A notification server may be configured to receive a message from a device, determine a device location from the message, determine a location identifier corresponding to the determined device location, and send the location identifier to the device. The device may be configured to generate a configuration identifier based on the location identifier and send a configuration data request including the configuration identifier to a cache server. The cache server may be configured to receive the configuration data request from the device, select a device configuration corresponding to the configuration identifier, where the device configuration is specific to the device location, and send the selected device configuration to the device. The device may be further configured to configure the device according to the selected device configuration.

31 Claims, 9 Drawing Sheets

(56) References Cited

U.S. PATENT DOCUMENTS

| | | | | |
|---|---|---|---|---|
| 2015/0288760 | A1* | 10/2015 | Thomas | H04L 67/1095 |
| | | | | 709/203 |
| 2016/0155295 | A1* | 6/2016 | Mound | G07F 17/3209 |
| | | | | 463/19 |
| 2017/0353813 | A1* | 12/2017 | Matthews | H04W 4/50 |

* cited by examiner

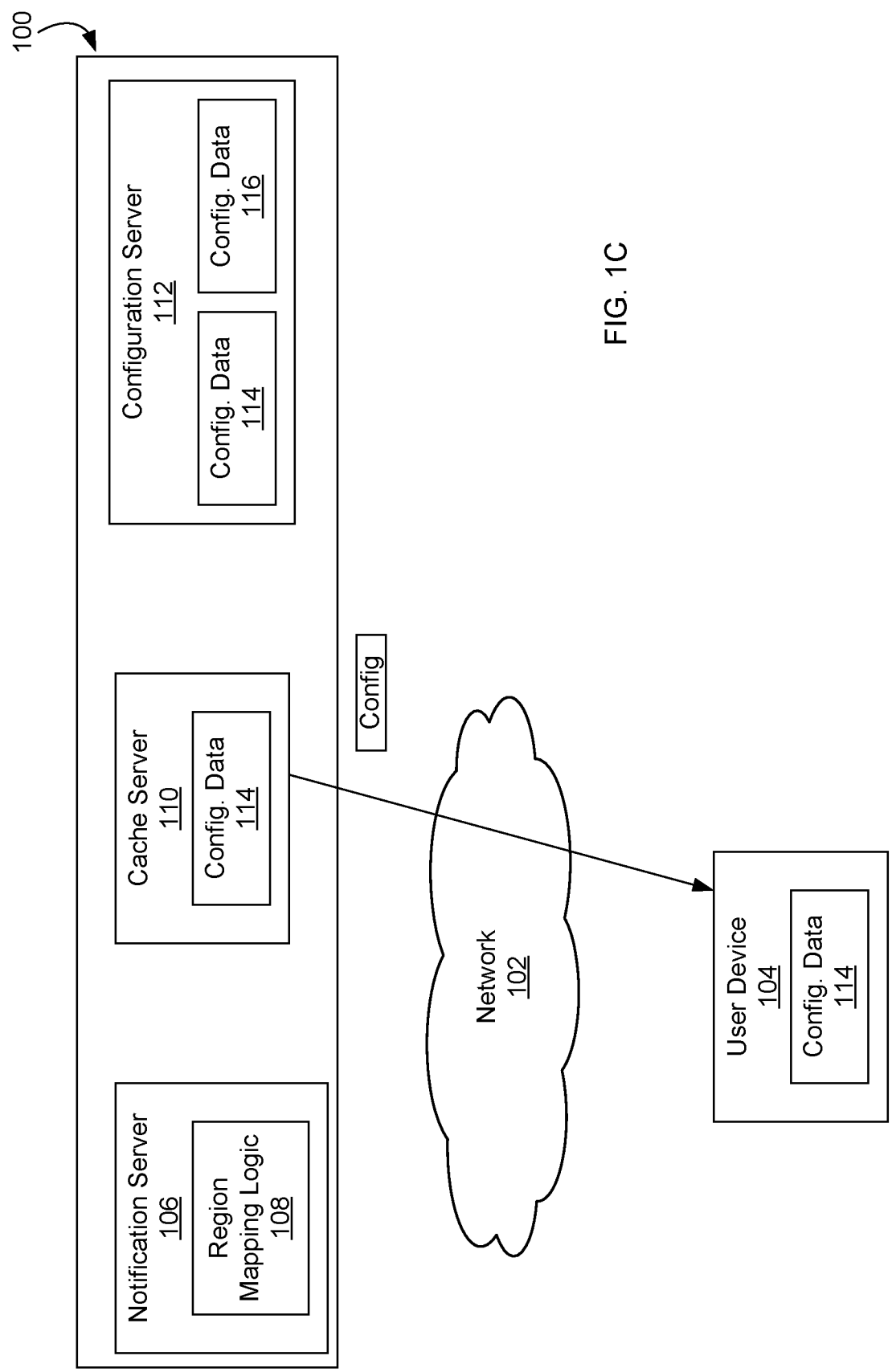

REGION-SPECIFIC CONFIGURATION

CROSS-REFERENCE TO RELATED APPLICATION

This application claims priority from U.S. Provisional Application No. 62/348,827, filed Jun. 10, 2016, the entirety of which is incorporated by reference herein.

TECHNICAL FIELD

The disclosure generally relates to delivering configuration data to a device.

BACKGROUND

Computing devices such as personal computers, smart phones, tablets, and other devices may request and receive configuration data. For example, a device may receive configuration data when new configuration data is available (e.g., OS updates), upon device activation, or upon device transfer to a new user account. Individual applications of a device may also receive configuration data.

SUMMARY

Computing devices may communicate with notification servers to receive notifications and send messages. A notification server may add regional identifier information to notifications sent to a device. When the device requests configuration data, the device may include the regional identifier information in the request. This information may be used to route the request to the appropriate server and/or may be used by the server to select a region-specific configuration to send to the device. In some cases, the server may use one or more additional factors to select the specific configuration sent to the device.

Particular implementations provide at least the following advantages: A cache server may provide region-specific configuration data to devices based on their locations. Additional factors may also be used to select configuration data for a device. A notification server may provide a trusted indication of a device location for use in selecting configuration data, for example when a cache server delivering the configuration data is not under the control of the configuration data creator and/or notification server owner. These features may provide load balancing for a network by connecting devices with cache servers in their region and by providing different configurations allowing devices (even within the same region) to behave differently during network interactions. Configurations may be customized and delivered to users who are most likely to benefit from certain features and/or to regions where certain features are allowed or not allowed. Configurations may be customized to comply with jurisdictional restrictions on apps, content, media, etc. For example, some features, apps, media, etc., may be allowed in one jurisdiction but not another jurisdiction based on local law, licensing agreements, etc. Thus, by configuring devices based on region/jurisdiction, devices may be configured to comply with these legal/contractual requirements. Configurations may be modified based on current device location when the device moves from one location to another. Device resources (e.g., processing, battery, GPS, etc.) need not be used to determine device location, improving device performance and efficiency.

Details of one or more implementations are set forth in the accompanying drawings and the description below. Other features, aspects, and potential advantages will be apparent from the description and drawings, and from the claims.

DESCRIPTION OF DRAWINGS

FIGS. 1A-1D show an example system for delivering region-specific configuration data.

Like reference symbols in the various drawings indicate like elements.

DETAILED DESCRIPTION

Region-Specific Configurations

Figure 1A:
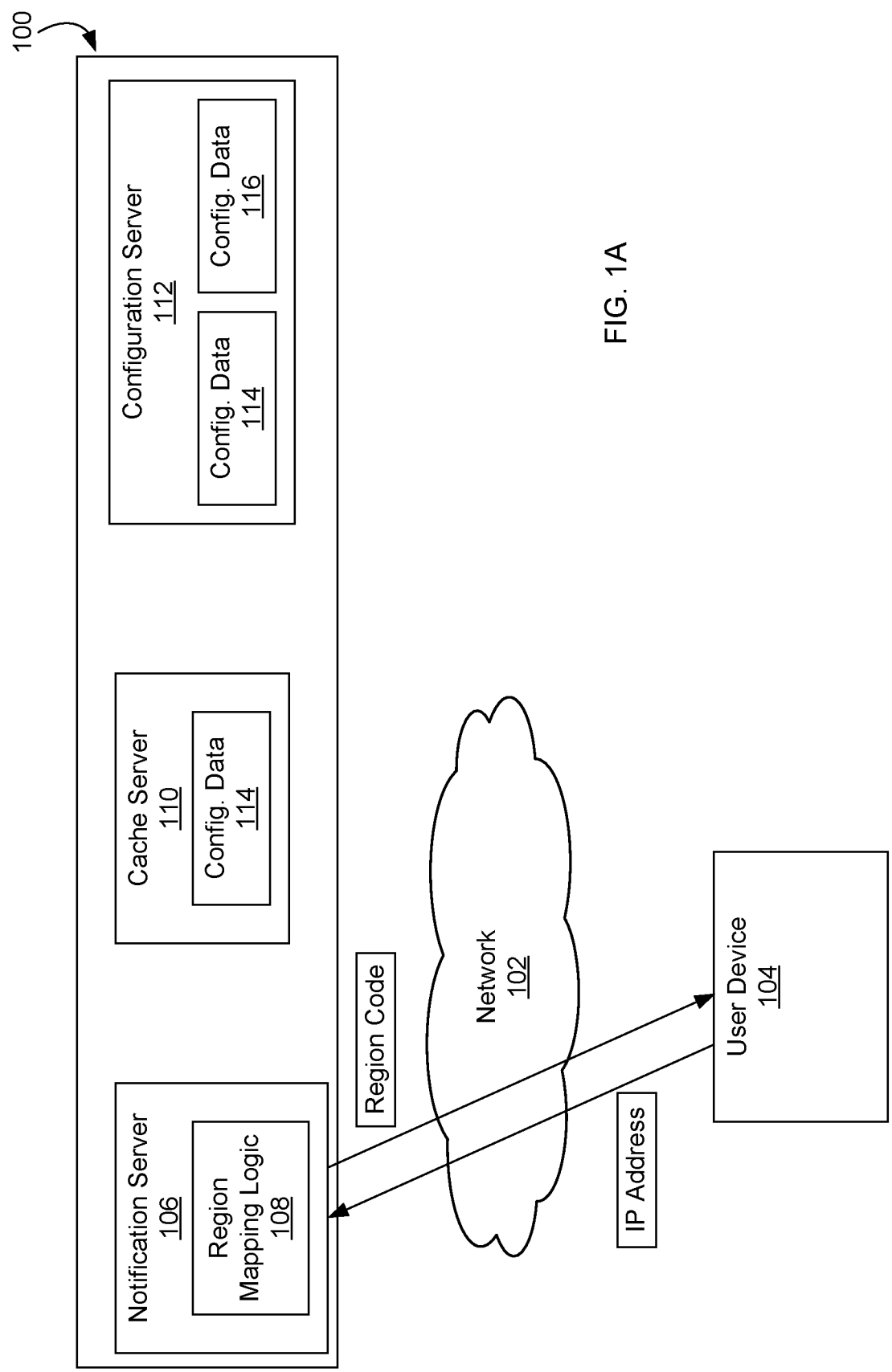

Systems and methods described herein may provide region-specific device configurations. Computing devices may include location data in requests for configuration data. This location data may be used to route the request to the appropriate server and/or may be used by the server to select a region-specific configuration to send to the device. In some cases, the server may use one or more additional factors to select the specific configuration sent to the device. The location data may be provided by a notification server, which may add regional identifier information to notifications sent to a device.

FIGS. 1A-1D show an example system 100 for delivering region-specific configuration data. System 100 may include one or more notification servers 106, cache servers or edge servers 110, and/or configuration servers 112 that may communicate with one another using one or more networks 102 (e.g., WAN, LAN, WLAN, Internet, Bluetooth and/or other peer-to-peer network). FIGS. 1A-1D also show a user device 104. Device 104 may be one of a variety of electronic devices including, but not limited to, laptop computers, desktop computers, computer terminals, television systems, tablet computers, e-book readers, smart phones, smart watches, and wearable computers. Device 104 may communicate with system 100 using the one or more networks 102 (e.g., using the Internet and/or a cellular network). Notification server 106 may be configured to deliver notifications to device 104 through the internet. Notification server 106 may manage delivery of notifications to user devices 104 associated with the same account identifier/user name. For example, notification server 106 may receive messages/notifications from other devices/servers (e.g., Facebook server, LinkedIn server, iMessage server, etc.) and forward the notifications to all user devices 104 associated with the same account.

FIG. 1A shows communications between device 104 and notification server 106. Device 104 and notification server 106 may communicate in the course of device 104 general use. For example, notification server 106 may send notifications (e.g., message notifications, device update notifications, maintenance notifications, etc.) to device 104 as they become available. Device 104 may send messages to notification server 106, for example to acknowledge receipt of notifications and/or periodically to maintain connection with notification server 106. Messages transmitted by device 104 may contain information indicative of device 104 location, such as an internet protocol (IP) address of device 104. For example, while many modern computing devices are configured with location determining systems (e.g., a global navigational satellite system receiver, Wi-Fi-based location subsystem, cellular-based location subsystem, etc.), many devices do not have the hardware and/or software components necessary to implement these location determining systems. However, all computing devices may be assigned an IP address when connecting to and communicating over an IP network. Thus, the device's IP address may provide a reliable and consistent way of determining the location of various types of user devices that may have different configurations and/or features.

Notification server 106 may use region mapping logic 108 to map received information indicative of device 104 location onto a regional identifier. For example, notification server 106 may map an IP address, which may be location-specific, onto a regional identifier. Notification server 106 may determine device 104 location based on IP address and determine country code (or other level code, e.g., city, state, continent, etc.) based on determined device 104 location. The country code (e.g., US, CN, TW, 01, 02, 13, etc.) or other level code may serve as the regional identifier in some embodiments. Notification server 106 may insert the regional identifier into notifications (e.g., the next or any subsequent notification) sent to device 104 or may send the regional identifier in a separate message. In some embodiments, notification server 106 may determine one or more additional factors that may specify the configuration data to send to device 104, as described in greater detail below.

Figure 1B:
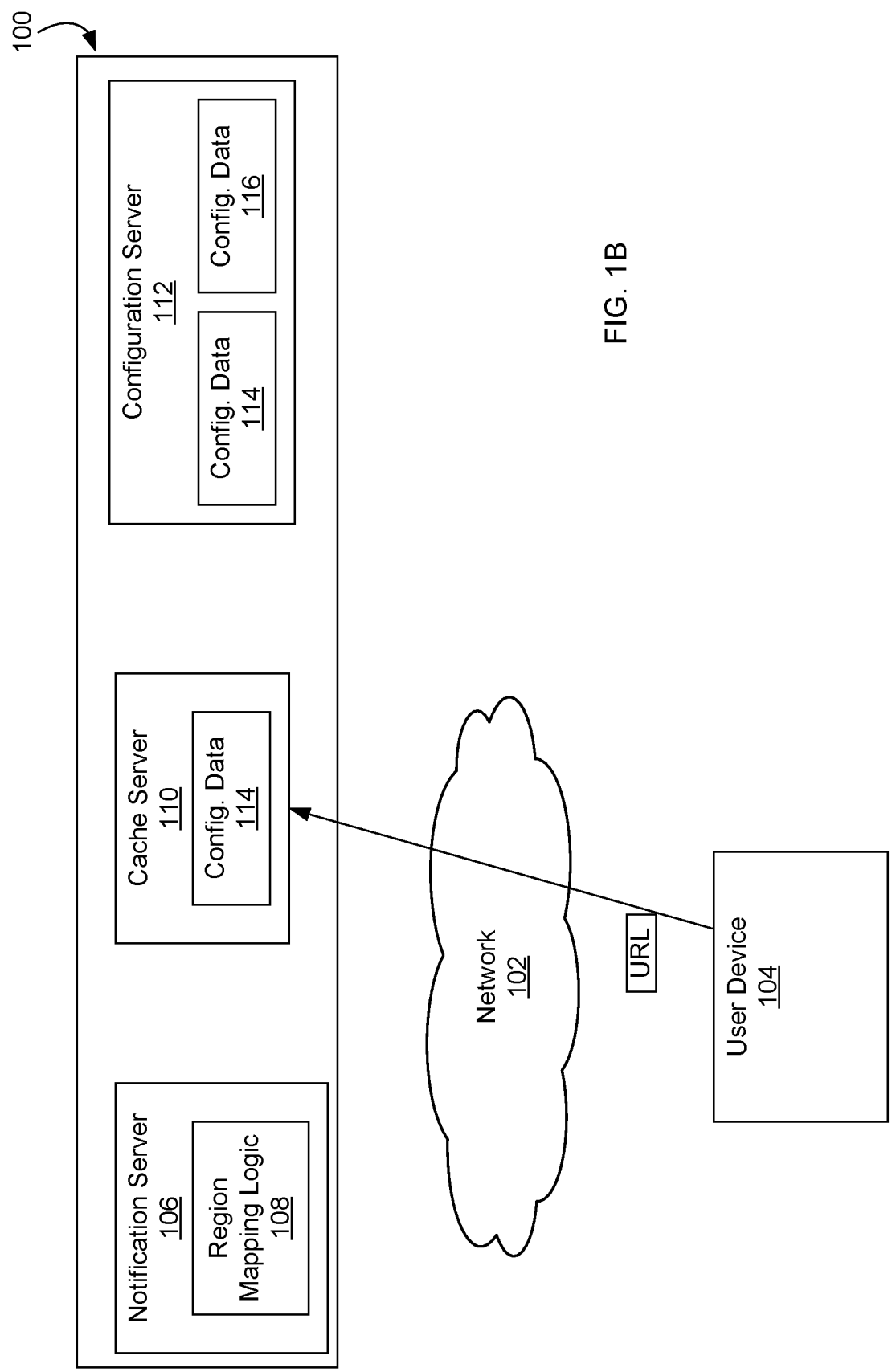

FIG. 1B shows communications between device 104 and cache server 110. Device 104 may request configuration data from cache server 110. For example, device 104 may request configuration data in response to receiving a notification from notification server 106 indicating that the configuration data is available. Device 104 may request configuration data in response to changing locations, regions, countries, jurisdictions, etc., as indicated by the region code received from notification server 106 or as indicated by other location data generated by location determining subsystems of device 104 or other location information received from external (e.g., network) sources. Device 104 may request configuration data in response to a request to reset device 104 to factory settings or otherwise reconfigure device 104. When requesting configuration data, device 104 may transmit the regional code obtained from notification server 106 to cache server 110. In some embodiments, device 104 may request a configuration specific to its current region by generating a URL with the regional code (e.g., US, CN, TW, 04, 15, 21, etc.), such as the following example: http://configuration-server/config?rg=US. In other embodiments, device 104 may encode the regional identifier into the configuration data request in other ways.

FIG. 1C shows further communications between device 104 and cache server 110. Cache server 110 may receive the encoded regional identifier (e.g., the URL) from device 104, identify configuration data 114 specific to the region, and send the region-specific configuration data 114 to device 104. For example, device 104 may be in the United States, so cache server 110 may locate configuration data for the United States (configuration data 114) in local storage and send it to device 104. Cache server 110 may include or be in communication with a configuration database that maps region identifiers to region-specific configuration data 114. For example, cache server 110 may look up the US regional identifier in the configuration database and identify the US configuration data 114 that is matched with the US identifier.

Figure 1D:
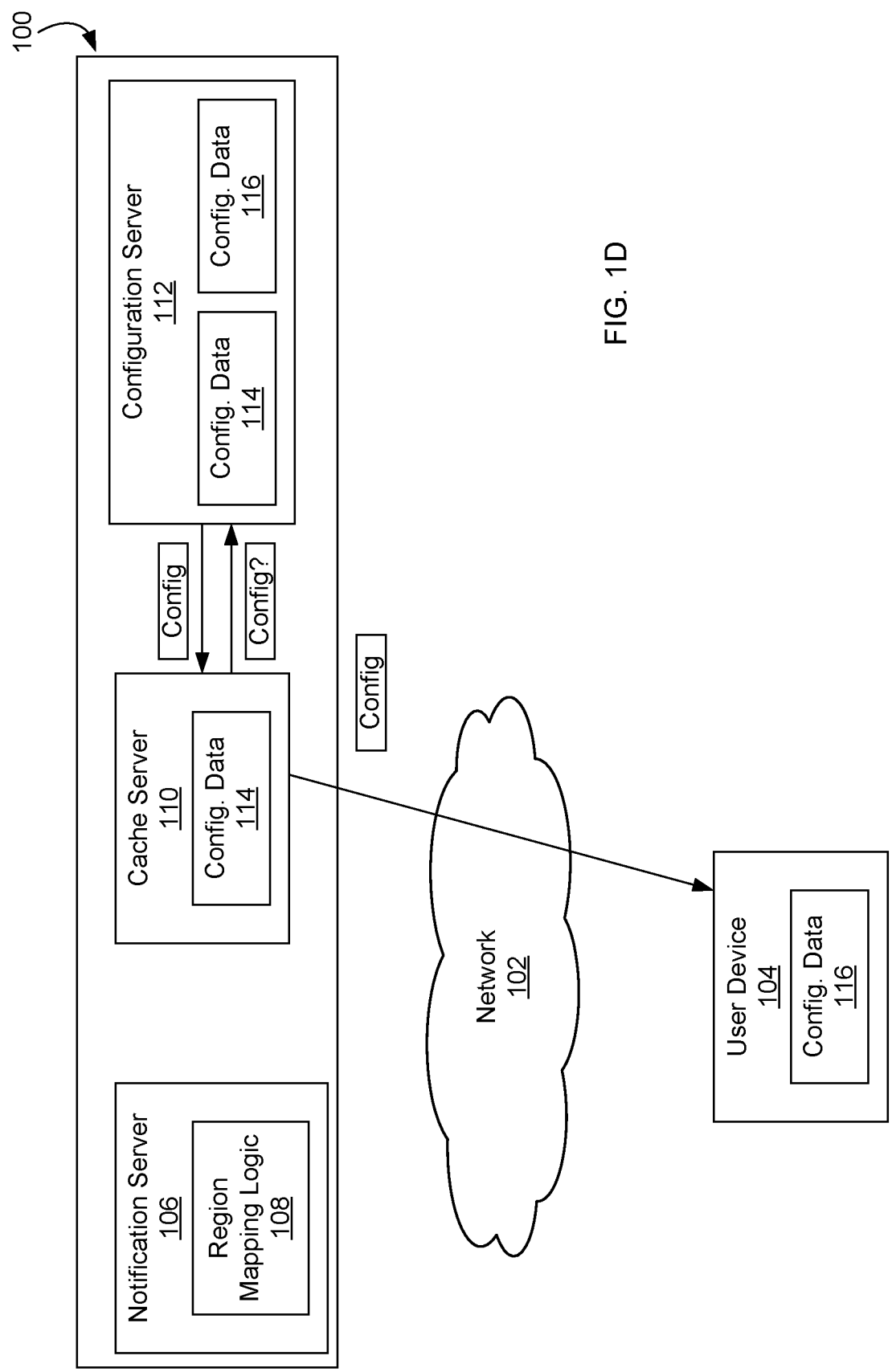

FIG. 1D shows communications between device 104 and cache server 110 and between cache server 110 and configuration server 112. In some embodiments, upon receiving the configuration data request from device 104, cache server 110 may determine whether a regional configuration for device 104 region exists in local storage. If not, cache server 110 may request the appropriate regional configuration 116 from configuration server 112 and return the configuration 116 to device 104. For example, cache server 110 may have the United States configuration in local storage, but may not have the Canada configuration 116. If device 104 regional code indicates device 104 is in Canada, cache server 110 may request and receive the Canada configuration 116 from configuration server 112 and send it to device 104. Cache server 110 may optionally save (e.g., cache) the configuration 116 received from configuration server 112 in local storage to facilitate future requests without having to communicate with configuration server 112.

Example Processes

Figure 2:
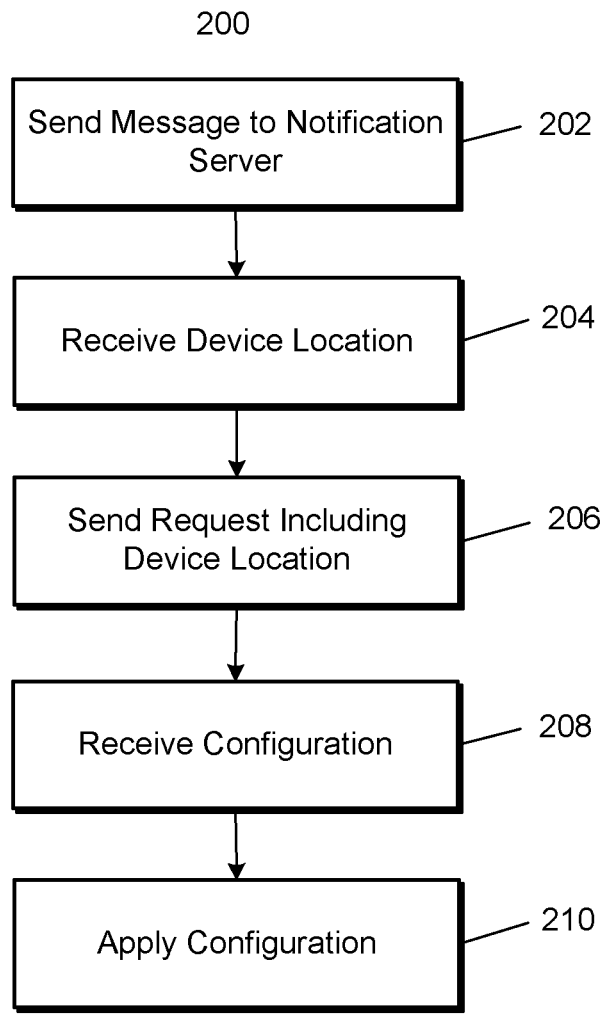
FIG. 2 is a flow diagram of an example process for requesting and applying configuration data.

FIG. 2 is a flow diagram of an example process 200 for requesting and applying configuration data. Device 104 may perform process 200 to receive device location information and receive and apply configuration data In step 202, device 104 may send a message to notification server 106. For example, the message may acknowledge receipt of notifications and/or may be a periodically sent message to maintain connection with notification server 106. Messages transmitted by device 104 may contain information indicative of device 104 location, such as an IP address of device 104. However, the messages transmitted by device 104 need not specify the location of device 104 in themselves (e.g., the messages may not include message data describing the location of device 104). In other words, the messages sent by device 104 need not be messages reporting device 104 location, but instead may be messages for other purposes (e.g., acknowledging notification receipt, maintaining connection, etc.).

In step 204, device 104 may receive a message from notification server 106 including a regional identifier specifying device 104 location. For example, regional identifier may include a country code or other level code generated by notification server 106 based on the information indicative of device 104 location sent in step 202. In some embodiments, the message from notification server 106 may also include one or more additional factors defining which configuration device 104 is to receive. The message may be received within a notification sent to device 104 or a separate message sent specifically to report device 104 location, for example.

In step 206, device 104 may send a request for configuration information, including the regional identifier received from notification server 106 and any additional factors, if applicable, to cache server 110. For example, the notification from notification server 106 may report availability of a configuration update, prompting device 104 to request the update. In other examples, a user may manually request an update, may install or activate a feature or application requiring a configuration update, or the like. In any case, any request for configuration information made after receipt of the regional identifier may include the regional identifier. In some embodiments, notification server 106 may combine the regional identifier and additional factors into a single code that is sent to device 104. For example, if the US has 3 possible configurations, notification server 106 may send code US1, US2, or US3. In other embodiments, notification server 106 may send the regional identifier and additional factors as separate portions of a message, and device 104 may generate a code to request the specific configuration from cache server 110.

In step 208, device 104 may receive the requested configuration from cache server 110. The received configuration may have been selected or obtained by cache server 110 based at least in part on the regional identifier supplied in step 206.

In step 210, device 104 may apply the received configuration. For example, device 104 may update settings, install new software, or the like, based on the information in the received configuration. The resulting changes to the device 104 may be region specific for the location determined by notification server 106.

Figure 3:
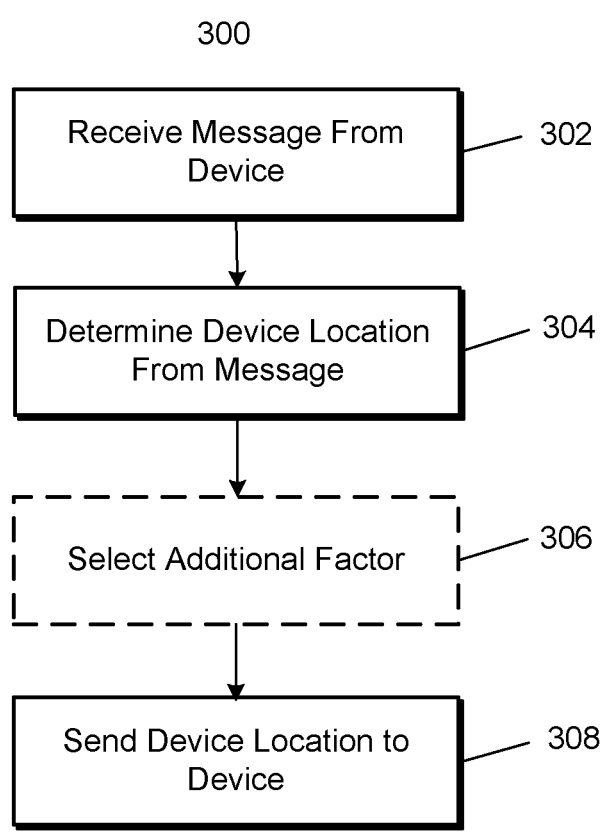
FIG. 3 is a flow diagram of an example process for determining device location.

FIG. 3 is a flow diagram of an example process 300 for determining device 104 location. Notification server 106 may perform process 300 to provide a trusted regional identifier to device 104. For example, notification server 106 may utilize a preexisting secure communication channel (e.g., encrypted notifications sent in the normal course of using device 104) to deliver the regional identifier, which may be more difficult to hack or spoof than a more public connection such as a public GPS signal, location server, etc. Additionally, notification server 106 may be in a better position to provide the regional identifier than cache server 110 in some embodiments, because notification server 106 may be controlled and/or operated by the same entity responsible for creating configurations, whereas cache server 110 may not. Thus, the configuration provider may be able to codify regional identifiers within the notification server 106.

In step 302, notification server 106 may receive a message from device 104. For example, device 104 may send messages to acknowledge receipt of notifications and/or periodically to maintain connection with notification server 106. Messages transmitted by device 104 may contain information indicative of device 104 location, such as an IP address of device 104.

In step 304, notification server 106 may determine device 104 location, and thus determine a regional identifier for device 104, based on information in the message received in step 302. For example, notification server 106 may map an IP address, which may be location-specific, onto a regional identifier. Notification server 106 may determine device 104 location based on IP address and determine country code (or other level code, e.g., city, state, continent, etc.) based on determined device 104 location. The country code (e.g., US, CN, TW, etc.) or other level code may serve as the regional identifier in some embodiments.

In step 306, in some embodiments, notification server 106 may select one or more additional factors used to select the configuration for device 104 in addition to the regional identifier. In some cases, a given region may have multiple available configurations, so notification server 106 may apply additional factors in selecting the specific configuration to be sent to device 104.

For example, the additional factors may include a random number (e.g., on a 1-6 scale, any number from 1-3 may receive regional configuration A, and any number from 4-6 may receive regional configuration B). For example, a device 104 developer may deploy a new product/service to a country but doesn't have the servers in place to support a full deployment. If the servers can only support ⅓ of the population, the developer can control deployment (e.g., limit it to ⅓) by only configuring ⅓ of devices 104 in this country to use the new product/service. The developer can do this by specifying two configurations C1 & C2 (new product). When a device 104 connects to notification server 106, notification server 106 may generate a random number, perform a modulo operation on the random number (e.g., random_number modulo 3=(0, 1, 2)). If the result is 0, C2 (new product) configuration may be provided. If the result is 1 or 2, then C1 (old configuration) may be provided. As more servers are deployed, 0 and 1 can map to C2, until eventually all devices 104 in this country get the C2 configuration.

Other example additional factors may include an account identifier (e.g., certain users may receive certain configurations based on payment or device usage, or if a user has multiple devices, each device may receive the same configuration within a region, or if a user uses certain applications more than others they may receive configurations designed to optimize those frequently-used applications, etc.), or other factors. For example, continuing the example above wherein devices 104 in a country with insufficient server deployment randomly receive new configuration C2, all devices 104 associated with the same user ID may receive the same configuration so the user is not confused by a new feature on some but not all devices 104.

In step 308, notification server 106 may send the regional identifier to device 104. Notification server 106 may insert the regional identifier into a future notification sent to device 104 or may send the regional identifier in a separate message, for example. In some embodiments, notification server 106 may combine the regional identifier and additional factors into a single code that is sent to device 104. For example, if the US has 3 possible configurations, notification server 106 may send code US1, US2, or US3. In other embodiments, notification server 106 may send the regional identifier and additional factors as separate portions of a message, and device 104 may generate a code to request the specific configuration from cache server 110.

Figure 4:
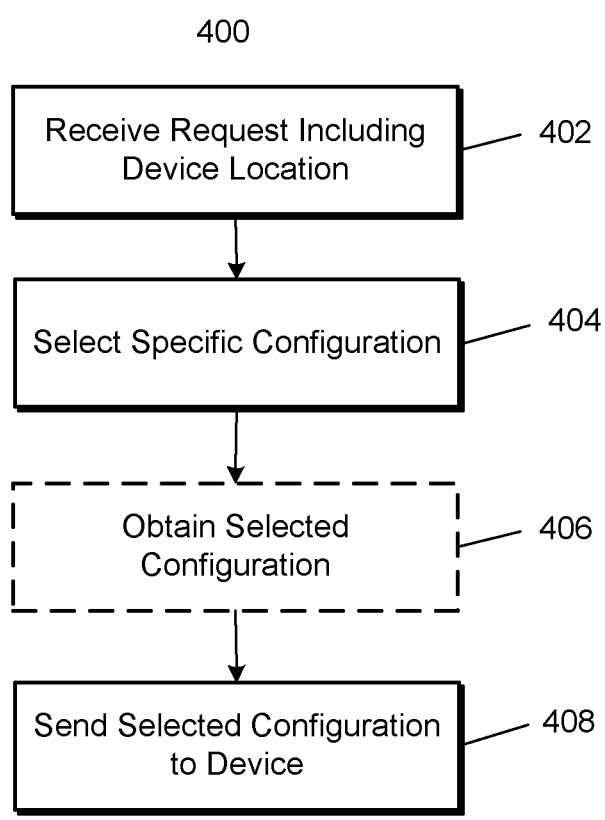
FIG. 4 is a flow diagram of an example process for selecting configuration data.

FIG. 4 is a flow diagram of an example process 400 for selecting configuration data. Cache server 110 may perform this process 400 to select and deliver an appropriate configuration to device 104 based at least in part on the region in which device 104 is operating.

In step 402, cache server 110 may receive a request for configuration data from device 104. The request may include the regional identifier specifying device 104 location. For example, the request may include "http://configuration-server/config?rg=US," wherein the "US" is the country code and regional identifier for the United States.

In step 404, cache server 110 may select a configuration for device 104 based on the regional identifier and, in some cases, any additional factors chosen in step 404. For example, device 104 may be in the United States and may have sent a "US" code, so cache server 110 may select configuration data for the United States. In another example, device 104 may be in the United States and may belong to a user who has received US configuration A on another device. Device 104 may have sent a "US-A" code, so cache server 110 may select US configuration A, as opposed to US configuration B or C. Cache server 110 may use the received code to perform a lookup in a configuration database and identify the configuration corresponding to the code, for example.

In step 406, if the selected configuration is not available in cache server 110 local storage, cache server 110 may obtain the selected configuration from configuration server 112. For example, cache server 110 may be in Mexico, and device 104 may be in the United States. However, all US based cache servers may be busy, and device 104 may connect to Mexican cache server 110. Because cache server 110 typically serves configurations to Mexico-based devices, it may not keep the selected US configuration in local storage. Therefore, cache server 110 may request the selected configuration from configuration server 112. Configuration server 112 may send the selected configuration to cache server 110.

In step 408, cache server 110 may send the selected configuration to device 104. In situations where cache server 110 has received the configuration from configuration server 112, cache server 110 may either forward the received configuration on to device 104 without saving it or may save the received configuration in local storage.

In some embodiments, the processes 200, 300, and 400 may be repeated whenever device 104 moves from one region to another. For example, device 104 communications to notification server 106 may include data indicative of the fact that device 104 has entered a different region from that in which it had previously been configured. Therefore, notification server 106 may generate and transmit updated location identifier data to device 104. Device 104 may request new configuration data for the new region and reconfigure itself using the new configuration data for the new region.

In some embodiments, the processes 200, 300, and 400 may be used to select region-specific data other than configuration data. Any data that has a region-specific component may be identified, selected, and sent in similar fashion. For example, region-specific notifications, third-party applications, graphics, information, or the like may all be substituted for the configuration data in other embodiments.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 5:
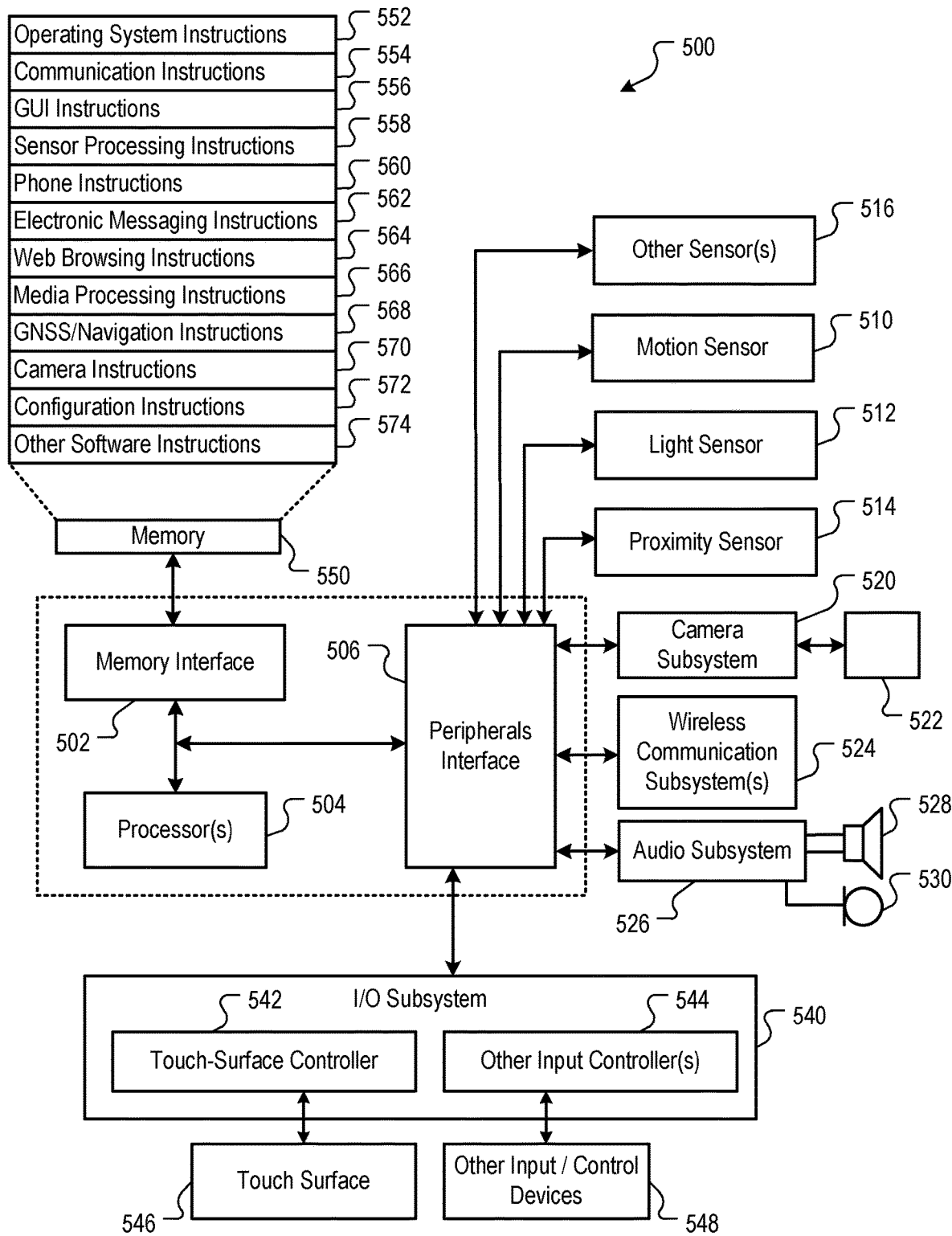
FIG. 5 is an example device configured for receiving configuration data.

FIG. 5 is a block diagram of an example computing device 500 that may implement the features and processes of FIGS. 1A-4. For example, computing device 500 may be a user device 104 that interacts with notification server 106 and cache server 110 to request and obtain configuration data. The computing device 500 may include a memory interface 502, one or more data processors, image processors, and/or central processing units 504, and a peripherals interface 506. The memory interface 502, the one or more processors 504, and/or the peripherals interface 506 may be separate components or may be integrated in one or more integrated circuits. The various components in the computing device 500 may be coupled by one or more communication buses or signal lines.

Sensors, devices, and subsystems may be coupled to the peripherals interface 506 to facilitate multiple functionalities. For example, a motion sensor 510, a light sensor 512, and a proximity sensor 514 may be coupled to the peripherals interface 506 to facilitate orientation, lighting, and proximity functions. Other sensors 516 may also be connected to the peripherals interface 506, such as a global navigation satellite system (GNSS) (e.g., GPS receiver), a temperature sensor, a biometric sensor, magnetometer, or other sensing device, to facilitate related functionalities.

A camera subsystem 520 and an optical sensor 522, e.g., a charged coupled device (CCD) or a complementary metal-oxide semiconductor (CMOS) optical sensor, may be utilized to facilitate camera functions, such as recording photographs and video clips. The camera subsystem 520 and the optical sensor 522 may be used to collect images of a user to be used during authentication of a user, e.g., by performing facial recognition analysis.

Communication functions may be facilitated through one or more wireless communication subsystems 524, which can include radio frequency receivers and transmitters and/or optical (e.g., infrared) receivers and transmitters. For example, the BTLE and/or WiFi communications described above may be handled by wireless communication subsystems 524. The specific design and implementation of the communication subsystems 524 may depend on the communication network(s) over which the computing device 500 is intended to operate. For example, the computing device 500 may include communication subsystems 524 designed to operate over a GSM network, a GPRS network, an EDGE network, a WiFi or WiMax network, and a Bluetooth™ network. For example, the wireless communication subsystems 524 may include hosting protocols such that the device 500 can be configured as a base station for other wireless devices and/or to provide a WiFi service.

An audio subsystem 526 may be coupled to a speaker 528 and a microphone 530 to facilitate voice-enabled functions, such as speaker recognition, voice replication, digital recording, and telephony functions. The audio subsystem 526 may be configured to facilitate processing voice commands, voiceprinting, and voice authentication, for example.

The I/O subsystem 540 may include a touch-surface controller 542 and/or other input controller(s) 544. The touch-surface controller 542 may be coupled to a touch surface 546. The touch surface 546 and touch-surface controller 542 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of the speaker 528 and/or the microphone 530.

In one implementation, a pressing of the button for a first duration may disengage a lock of the touch surface 546; and a pressing of the button for a second duration that is longer than the first duration may turn power to the computing device 500 on or off. Pressing the button for a third duration may activate a voice control, or voice command, module that enables the user to speak commands into the microphone 530 to cause the device to execute the spoken command. The user may customize a functionality of one or more of the buttons. The touch surface 546 can, for example, also be used to implement virtual or soft buttons and/or a keyboard.

In some implementations, the computing device 500 may present recorded audio and/or video files, such as MP3, AAC, and MPEG files. In some implementations, the computing device 500 may include the functionality of an MP3 player, such as an iPod™. The computing device 500 may, therefore, include a 36-pin connector that is compatible with the iPod. Other input/output and control devices may also be used.

The memory interface 502 may be coupled to memory 550. The memory 550 may include high-speed random access memory and/or non-volatile memory, such as one or more magnetic disk storage devices, one or more optical storage devices, and/or flash memory (e.g., NAND, NOR). The memory 550 may store an operating system 552, such as Darwin, RTXC, LINUX, UNIX, OS X, WINDOWS, or an embedded operating system such as VxWorks.

The operating system 552 may include instructions for handling basic system services and for performing hardware dependent tasks. In some implementations, the operating system 552 may be a kernel (e.g., UNIX kernel). In some implementations, the operating system 552 may include instructions for performing voice authentication.

The memory 550 may also store communication instructions 554 to facilitate communicating with one or more additional devices, one or more computers and/or one or more servers. The memory 550 may include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 866 to facilitate media processing-related processes and functions; GNSS/Navigation instructions 568 to facilitate GNSS and navigation-related processes and instructions; and/or camera instructions 570 to facilitate camera-related processes and functions.

The memory 550 may store configuration instructions 572 to facilitate other processes and functions, such as the configuration data request and application processes and functions as described with reference to FIGS. 1A-4.

The memory 550 may also store other software instructions 574, such as web video instructions to facilitate web video-related processes and functions; and/or web shopping instructions to facilitate web shopping-related processes and functions. In some implementations, the media processing instructions 566 may be divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 550 may include additional instructions or fewer instructions. Furthermore, various functions of the computing device 500 may be implemented in hardware and/or in software, including in one or more signal processing and/or application specific integrated circuits.

Figure 6:
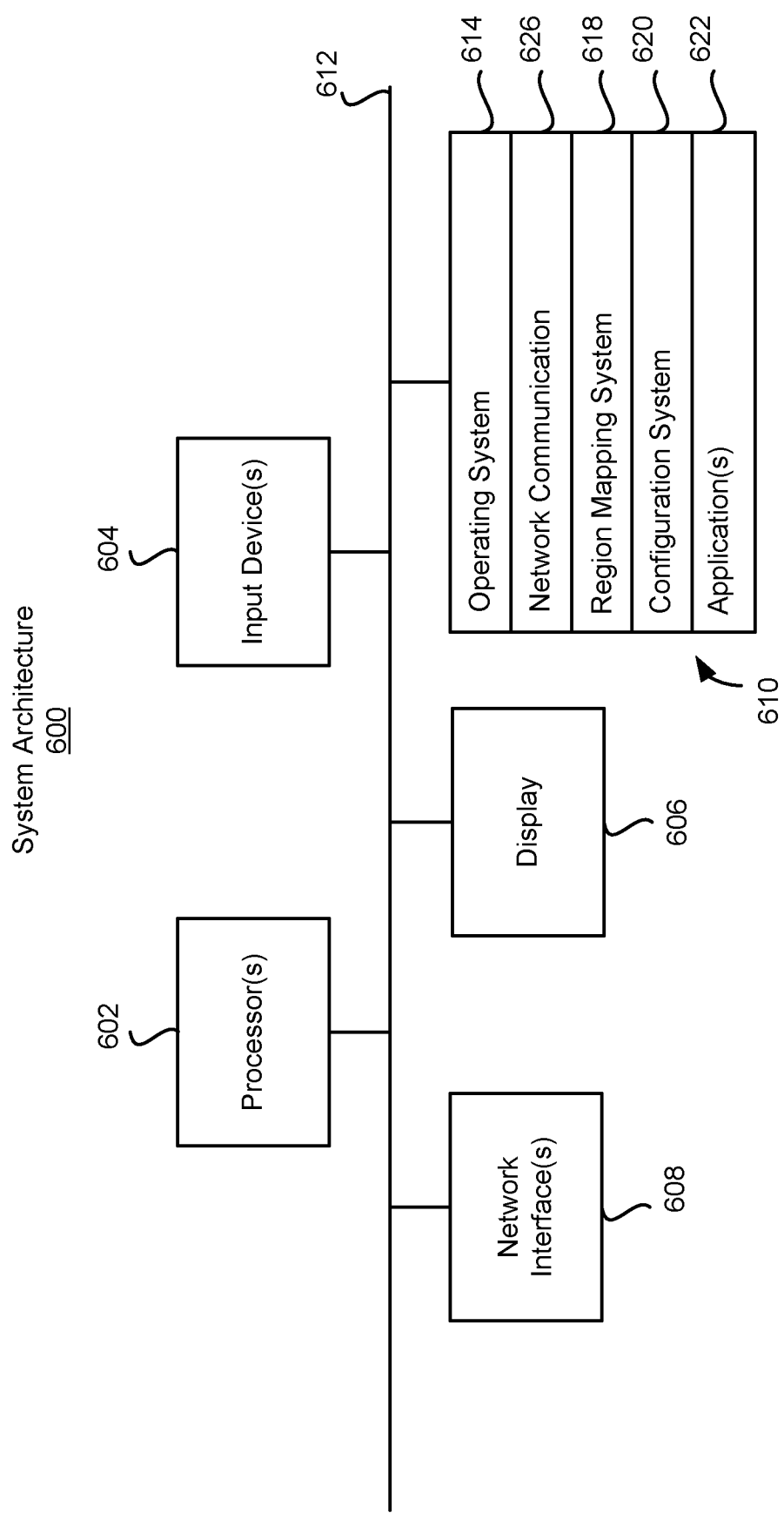
FIG. 6 is an example server configured for determining device location and/or selecting configuration data.

FIG. 6 is a block diagram of an example system architecture implementing the features and processes of FIGS. 1A-4. The architecture 600 may be implemented on any electronic device that runs software applications derived from compiled instructions, including without limitation personal computers, servers, smart phones, media players, electronic tablets, game consoles, email devices, etc. In some implementations, the architecture 600 may include one or more processors 602, one or more input devices 604, one or more display devices 606, one or more network interfaces 608, and one or more computer-readable mediums 610. Each of these components may be coupled by bus 612.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which may be controlled directly or through an I/O controller; and managing traffic on bus 612. Network communications instructions 616 may establish and maintain network connections (e.g., software for implementing communication protocols, such as TCP/IP, HTTP, Ethernet, etc.).

A region mapping system 618 may include instructions that perform region mapping, for example when the architecture 600 is implemented on notification server 106. A configuration system 620 may include instructions that perform configuration selection, storage, and/or retrieval, for example when the architecture is implemented on cache server 110 and/or configuration server 112.

Application(s) 622 may be an application that uses or implements the processes described in reference to FIGS. 1A-4. The processes may also be implemented in operating system 614.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
    receiving, at a cache server, a configuration data request from a device, wherein the configuration data request comprises a configuration identifier that identifies a specific application configuration based upon a location of the device as previously determined by a notification server and provided to the device, wherein the configuration identifier is generated by the device based on a location identifier indicative of a geographic region of Earth, wherein the notification server is configured to deliver notifications to the device, wherein the notifications are associated with one or more user accounts associated with the device;
    selecting, by the cache server, the specific application configuration corresponding to the configuration identifier, wherein the specific application configuration is specific to the location of the device; and
    sending, via the cache server, the selected application configuration to the device.

2. The method of claim 1, wherein the specific application configuration specific to the location of the device is selected from a plurality of application configurations specific to a plurality of different locations.

3. The method of claim 1, comprising determining, by the device, the configuration identifier based on a random selection, a profile associated with the device, a device identifier, a jurisdictional restriction, or a combination thereof.

4. The method of claim 1, comprising:
 determining, by the notification server, the location of the device; and
 determining, via the notification server, the location identifier based on the determined location of the device.

5. The method of claim 4, comprising determining, via the notification server, the location identifier based on a random selection, a profile associated with the device, a device identifier, a jurisdictional restriction, or a combination thereof.

6. The method of claim 1, further comprising:
 requesting, with the cache server, the selected application configuration from a configuration server; and
 receiving, at the cache server, the selected application configuration from the configuration server.

7. A system comprising:
 a cache server configured to:
  receive a configuration data request from a device, wherein the configuration data request comprises a configuration identifier that identifies a specific application configuration based upon a location of the device as previously determined by a notification server and provided to the device, wherein the configuration identifier is generated by the device based on a location identifier indicative of a geographic region of Earth, wherein the notification server is configured to deliver notifications to the device, wherein the notifications are associated with one or more user accounts associated with the device;
  select the specific application configuration corresponding to the configuration identifier, wherein the specific application configuration is specific to the location of the device; and
  send the selected application configuration to the device, wherein the device is configured to configure the device according to the selected application configuration.

8. The system of claim 7, wherein the cache server is configured to select the specific application configuration specific to the location of the device from a plurality of application configurations specific to a plurality of different locations.

9. The system of claim 7, wherein the at least one additional factor comprises a random selection, a profile associated with the device, a device identifier, a jurisdictional restriction, or a combination thereof.

10. The system of claim 7, comprising a notification server configured to:
 determine the location of the device; and
 determine the location identifier based on the determined location of the device.

11. The system of claim 10, wherein the notification server is configured to determine the location identifier based on a random selection, a profile associated with the device, a device identifier, a jurisdictional restriction, or a combination thereof.

12. The system of claim 7, wherein the cache server is further configured to:
 request the selected application configuration from a configuration server; and
 receive the selected application configuration from the configuration server.

13. The system of claim 12, further comprising the configuration server configured to store a plurality of application configurations specific to a plurality of different locations.

14. A method comprising, by a device:
 sending a message to a notification server, wherein the notification server is configured to deliver notifications to the device, wherein the notifications are associated with one or more user accounts associated with the device;
 receiving, from the notification server, a location identifier determined by the notification server based on a device location determined by the notification server from the message, wherein the location identifier is indicative of a geographic region of Earth;
 generating a configuration identifier based on the location identifier, wherein the configuration identifier identifies a specific application configuration based upon the device location;
 sending a configuration data request including the configuration identifier to a cache server;
 receiving, from the cache server, a selected application configuration corresponding to the configuration identifier and specific to the device location; and
 configuring the device according to the selected application configuration.

15. The method of claim 14, wherein the application configuration specific to the location of the device is selected from a plurality of application configurations specific to a plurality of different locations.

16. The method of claim 14, wherein generating the configuration identifier comprises further basing the configuration identifier on at least one additional factor.

17. The method of claim 16, wherein the at least one additional factor comprises one of the one or more user accounts associated with the device.

18. The method of claim 16, further comprising receiving the at least one additional factor from the notification server.

19. The method of claim 14, wherein the location identifier comprises an indication of the specific application configuration as selected at random by the notification server.

20. A non-transitory, computer readable medium including one or more sequences of instructions that, when executed by one or more processors at a device, causes the one or more processors to:
 send a message to a notification server, wherein the notification server is configured to deliver notifications to the device, wherein the notifications are associated with one or more user accounts associated with the device;
 receive, from the notification server, a location identifier determined by the notification server based on a device location determined by the notification server from the message, wherein the location identifier is indicative of a geographic region of Earth;
 generate a configuration identifier based on the location identifier, wherein the configuration identifier identifies a specific application configuration based upon the device location;
 send a configuration data request including the configuration identifier to a cache server;
 receive, from the cache server, a selected application configuration corresponding to the configuration identifier and specific to device location; and
 configure the device according to the selected application configuration.

21. The non-transitory, computer readable medium of claim 20, wherein the application configuration specific to the device location is selected from a plurality of application configurations specific to a plurality of different locations.

22. The non-transitory, computer readable medium of claim 20, wherein the one or more sequences of instructions cause the one or more processors to generate the configuration identifier comprises further basing the configuration identifier on at least one additional factor.

23. The non-transitory, computer readable medium of claim 22, wherein the at least one additional factor comprises a random selection, a profile associated with the device, a device identifier, a jurisdictional restriction, or a combination thereof.

24. The non-transitory, computer readable medium of claim 22, wherein the one or more sequences of instructions further cause the one or more processors to receive the at least one additional factor from the notification server.

25. The non-transitory, computer readable medium of claim 20, wherein the location identifier comprises a device identifier.

26. The method of claim 16, wherein the at least one additional factor comprises a jurisdictional restriction.

27. The method of claim 21, wherein the location identifier comprises an indication of the selected application configuration, as randomly selected from a portion of the plurality of application configurations specific to the device location.

28. The method of claim 14, wherein:
the notification server is controlled by a first party; and
the configuration server is controlled by a second party different from the first party.

29. The method of claim 14, comprising sending the message in response to receiving a first notification associated with the one or more user accounts associated with the device.

30. The method of claim 29, wherein receiving the location identifier comprises receiving, from the notification server, the location identifier with a second notification associated with the one or more user accounts associated with the device.

31. The method of claim 14, wherein the geographic region comprises a country.

* * * * *